(12) United States Patent
Haslauer et al.

(10) Patent No.: US 11,111,939 B2
(45) Date of Patent: Sep. 7, 2021

(54) METHOD FOR UNDETACHABLY INTRODUCING GUIDING AID ELEMENTS INTO A COMPONENT, COMPONENT WITH GUIDING AID ELEMENTS AND COMPOSITE COMPONENT

(71) Applicant: Bayerische Motoren Werke Aktiengesellschaft, Munich (DE)

(72) Inventors: Christian Haslauer, Freising (DE); Peter Hirsch, Freising (DE); Robert Kirschner, Olching (DE); Bernhard Glueck, Fuerstenfeldbruck (DE); Martin Becker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 16/238,737

(22) Filed: Jan. 3, 2019

(65) Prior Publication Data
US 2019/0136888 A1   May 9, 2019

Related U.S. Application Data

(63) Continuation of application No. PCT/EP2017/064472, filed on Jun. 14, 2017.

(30) Foreign Application Priority Data

Jul. 25, 2016   (DE) .................... 10 2016 213 578.3

(51) Int. Cl.
*F16B 5/08* (2006.01)
*B21J 15/00* (2006.01)
(Continued)

(52) U.S. Cl.
CPC ................. *F16B 5/08* (2013.01); *B21J 15/00* (2013.01); *B21K 25/00* (2013.01); *B23K 11/115* (2013.01);
(Continued)

(58) Field of Classification Search
CPC .......... F16B 5/08; F16B 17/00; F16B 11/006; F16B 19/04; B21K 25/00; B23K 11/34; B23K 11/115; B23K 11/20; B21J 15/00
See application file for complete search history.

(56) References Cited

U.S. PATENT DOCUMENTS 2,948,041 A * 8/1960 Evans .................... A44C 7/006
                                                           24/499
6,370,752 B1 * 4/2002 Anderson ............... F01D 5/186
                                                 29/402.11

(Continued)

FOREIGN PATENT DOCUMENTS

| CH | 702 672 A1 | 8/2011 |
|----|------------|--------|
| DE | 1 577 090 A1 | 4/1970 |

(Continued)

OTHER PUBLICATIONS

Chinese-language Office Action issued in Chinese Application No. 201780032688.3 dated May 7, 2020 with English translation (16 pages).

(Continued)

*Primary Examiner* — Lawrence Averick
(74) *Attorney, Agent, or Firm* — Crowell & Moring LLP

(57) ABSTRACT

A method for undetachably introducing a guiding aid element into at least one joining location of at least one component is provided. The method includes the acts of: a) perforating the at least one component at the at least one joining location in a first press stroke of a tool press, wherein a preliminary hole is formed at the at least one joining location; b) inserting a joining aid element into the at least one preliminary hole; and c) pressing the at least one joining aid element with the at least one component in a subsequent press stroke or working step to form a material-bonding, form-fitting and/or force-fitting connection between the at (Continued)

least one component and the at least one joining aid element. A component and a composite component produced by such a method are also provided.

11 Claims, 3 Drawing Sheets

(51) Int. Cl.
    *B23K 11/11*     (2006.01)
    *B23K 11/20*     (2006.01)
    *F16B 11/00*     (2006.01)
    *B23K 11/34*     (2006.01)
    *B21K 25/00*     (2006.01)
    *F16B 17/00*     (2006.01)

(52) U.S. Cl.
    CPC .............. *B23K 11/20* (2013.01); *B23K 11/34* (2013.01); *F16B 11/006* (2013.01); *F16B 17/00* (2013.01)

(56) References Cited

U.S. PATENT DOCUMENTS

| | | | |
|---|---|---|---|
| 6,389,865 B1 * | 5/2002 | Easterbrook | B21C 23/001 72/334 |
| 10,118,254 B2 | 11/2018 | Sakai | |
| 2007/0271988 A1 | 11/2007 | Rothermund et al. | |
| 2013/0270229 A1 | 10/2013 | Pedersen et al. | |

FOREIGN PATENT DOCUMENTS

| | | |
|---|---|---|
| DE | 39 09 387 C1 | 4/1990 |
| DE | 44 22 708 A1 | 11/1995 |
| DE | 101 17 060 A1 | 10/2002 |
| DE | 10 2004 004 384 A1 | 9/2005 |
| DE | 10 2004 025 492 A1 | 8/2009 |
| DE | 10 2010 020 569 A1 | 11/2011 |
| DE | 10 2012 212 214 A1 | 1/2014 |
| DE | 10 2014 204 643 A1 | 10/2014 |
| DE | 10 2013 010 443 A1 | 12/2014 |
| JP | 2015-44228 A | 3/2015 |
| JP | 2015044228 A * | 3/2015 |
| JP | 2015-62916 A | 4/2015 |
| WO | WO 2012/041515 A1 | 4/2012 |

OTHER PUBLICATIONS

International Search Report (PCT/ISA/210) issued in PCT Application No. PCT/EP2017/064472 dated Aug. 25, 2017 with English translation (seven pages).

German-language Written Opinion (PCT/ISA/237) issued in PCT Application No. PCT/EP2017/064472 dated Aug. 25, 2017 (five pages).

German-language Search Report issued in counterpart German Application No. 10 2016 213 578.3 dated Mar. 20, 2017 with partial English translation (15 pages).

\* cited by examiner

METHOD FOR UNDETACHABLY INTRODUCING GUIDING AID ELEMENTS INTO A COMPONENT, COMPONENT WITH GUIDING AID ELEMENTS AND COMPOSITE COMPONENT

CROSS REFERENCE TO RELATED APPLICATIONS

This application is a continuation of PCT International Application No. PCT/EP2017/064472, filed Jun. 14, 2017, which claims priority under 35 U.S.C. § 119 from German Patent Application No. 10 2016 213 578.3, filed Jul. 25, 2016, the entire disclosures of which are herein expressly incorporated by reference.

BACKGROUND AND SUMMARY OF THE INVENTION

The invention relates to a method for undetachably introducing at least one auxiliary joining element into at least one component, and to a component having at least one undetachable auxiliary joining element, and to a component assembly.

In the scope of lightweight construction, it is increasingly often necessary, in particular in vehicle construction, to connect together components made of different, sometimes dissimilar materials, for example a component made of a nonferrous material, such as aluminum or a fiber-reinforced plastic, for example, to a second component which is formed from a ferrous material, in particular a steel material. Direct welding or soldering of these components is frequently not possible. In order, nevertheless, to allow for example resistance spot welding, it is known to use auxiliary joining elements. The auxiliary joining elements are pressed, or stamped or inserted, into one of the components to be joined, for example in a similar manner to a riveting operation. The auxiliary joining elements are formed from a material which is weldable to the material of the other component. The two components to be joined are positioned relative to one another and a joined connection, for example a weld, is formed at the auxiliary joining elements.

The setting of the auxiliary joining elements or resistance welding elements in series production takes place usually by way of a robot-guided setting head of the riveting pliers type with a setting punch and corresponding die, which in each case presses or stamps an auxiliary joining element into the component, optionally with a pilot hole being formed beforehand. Each auxiliary joining element is set individually, to which end each setting point has to be approached separately.

Furthermore, the document DE 10 2013 010 443 A1 discloses a tool with which a plurality of resistance welding elements are able to be stamped into a workpiece at the same time without a pilot hole. To this end, the tool has a first and second tool part, and a plurality of setting heads arranged in the first and in the second tool part. As a result of the closing movement of the tool, the workpiece is able to be fixed in a defined position, and during the closing movement, the resistance elements are pressed into the workpiece from both tool sides by the setting heads.

For setting without a pilot hole, self-stamping or self-punching auxiliary joining elements are known, the shank end of which is in the form of a cutting edge or point, as known for example from the document DE 10 2004 025 492 A1. A drawback of these auxiliary joining elements is the complicated geometry for achieving a good connection strength, with the result that the elements are expensive to produce.

It is an object of the invention to specify a method for introducing auxiliary joining elements (or guiding aid elements) into at least one component, which does not have at least one drawback associated with the prior art, or has it to a reduced extent.

This and other objects are achieved by the method in accordance with embodiments of the invention. In addition, the invention also extends to a component, produced according to such a method with an auxiliary joining element, and extends to a component assembly, in which at least one auxiliary joining element has been pressed into at least one of the joined components by the method according to embodiments of the invention. Further advantageous configurations of the invention can be gathered from the dependent claims and the following description.

The method according to the invention for undetachably introducing an auxiliary joining element into at least one joint of at least one component includes the acts of:

a) punching the at least one component at the at least one joint in a first press stroke of a press, wherein a pilot hole is formed at the at least one joint, b) inserting an auxiliary joining element into the at least one pilot hole, and c) pressing the at least one auxiliary joining element together with the at least one component in a subsequent press stroke or work step, wherein a cohesive, form-fitting and/or force-fitting connection between the at least one component and the at least one auxiliary joining element is formed.

With each press stroke, the press carries out a linear closing movement of the tool. Depending on the type of tool located in the press, different component processing operations can be carried out. In order to punch the component, for example, a tool is used with for example a tool upper part and a tool lower part, between which the component is able to be clamped in a positionable manner, and which furthermore has corresponding stamping tools, for example mechanically actuable blanking dies.

The at least one joint denotes the point on the component(s) at which an auxiliary joining element is intended to be introduced. The auxiliary joining element can be pressed into only one component. Alternatively, it is also possible for several components, for example two, three or more components, partially or completely overlapping one another, to be provided with one or more common pilot holes. Into the common pilot hole, an auxiliary joining element is introduced, which projects through the several components. The pressing of the auxiliary joining element in this case results in a cohesive, form-fitting and/or force-fitting connection between the several components and the auxiliary joining element in a similar manner to a riveted connection.

At a later time, it is possible for example for a joined connection, such as a resistance spot weld, for example, with at least one further component to be produced at the joint provided with the auxiliary joining element. Usually, the at least one component has more than one joint, in which case a pilot hole is preferably formed at each of these joints.

The insertion of the auxiliary joining element can take place preferably in an automated manner via corresponding feed devices provided in the tool. Such feed devices are well known from conventional riveting pliers, in which, for example, individual riveting elements are fed by way of compressed air via feed lines. The insertion of the auxiliary joining element into the pilot hole can likewise be carried out manually, for example by a worker.

The insertion of the auxiliary joining elements can be carried out in a separate second press stroke, which takes place after the first press stroke, in which the pilot holes are formed, and before the press stroke in which the auxiliary joining elements are pressed together with the component. Preferably, however, the insertion of the auxiliary joining elements takes place before or in the same press stroke in which the auxiliary joining elements are pressed.

For pressing the auxiliary joining elements, a tool can be used in the press, said tool including, for example, appropriate riveting dies with corresponding dollies. Preferably, however, the auxiliary joining elements are pressed in with merely rigid tool components in the upper part and lower part (punch and die), which, if necessary, correspond to the form of the component. In a similar manner to the forming of the pilot holes, the component with inserted auxiliary joining elements can be fixed, for example, between a tool upper part and tool lower part. During the closing movement of the tool, the punches, interacting with the opposing side arranged on the opposite component side, upset and deform the auxiliary joining elements, resulting in the formation of an at least form-fitting, force-fitting or cohesive, preferably force-fitting and form-fitting, undetachable connection. The auxiliary joining elements introduced undetachably into the component(s) can be detached only by damaging or deforming the component and/or the auxiliary joining elements.

In a preferred configuration, the at least one component has a large number of joints, at which auxiliary joining elements are intended to be introduced. For example, two or three or more than three joints can be provided. In that case, a large number of pilot holes are formed in the at least one component, wherein a pilot hole is created at each joint and an auxiliary joining element is inserted into each pilot hole. All of the auxiliary joining elements inserted into the pilot holes are pressed together with the at least one component in a common press stroke.

The work steps of punching the component and pressing the auxiliary joining elements can be carried out with a common or with two different, press-bound tools. The conversion of the component between the tools can take place in a known manner, for example by way of a robot-guided gripping device.

Advantageously, the method for pressing in the auxiliary joining elements can be incorporated into existing, press-bound work steps in the production of the component. Thus, further component processing can additionally be carried out in each press stroke in which one of the above-described work steps takes place, for example processing of the component by forming or cutting. To this end, the tool can be configured in an appropriate manner, for example with a drawing punch or drawing die, a cutting device, or the like.

The pilot hole is preferably in the form of a through-hole with a hole wall which is bounded in each case by a hole edge toward the component surface. In an advantageous configuration, the two hole edges are each provided with a chamfer. By way of the chamfer, any burr that is present is removed. Furthermore, the chamfer simplifies the orientation of the auxiliary joining element while it is being pressed in and favors the formation of a form fit in that, in a preferred configuration, the auxiliary joining element can acquire the shape of a countersunk-head rivet in the pilot hole and forms an undercut on both sides with the component. For the creation of a shaped edge, it is possible for example for the stamping or cutting tool with which the pilot hole is formed to additionally be provided with corresponding portions that act as die stamps and/or separately actuable die stamps can be provided in the press-bound tool, for example slides.

This design of the pilot hole allows the use of auxiliary joining elements with simple geometries, wherein high strength of the connection is nevertheless achievable. Preferably, the auxiliary joining element is in the form of a metal slug, this being understood to be a head- and shank-free metal part. On account of the simple geometry, such a metal slug can be produced very cost-effectively, for example by being stamped out of a metal sheet or by being cut off a wire. The metal slug can have in particular a cylindrical, spherical, conical or frustoconical shape. The auxiliary joining element is in particular made of a material which is sufficiently suitable for welding or soldering with respect to the second component, to which the component provided with the auxiliary joining element is intended to be joined. The auxiliary joining element is preferably formed from a steel or aluminum workpiece.

Advantageously, by way of the method, all of the auxiliary joining elements to be introduced into the component(s) are introduced and pressed in together.

The method according to the invention can be used in particular in order to produce a component with at least one auxiliary joining element introduced in an undetachable manner. Preferably, the component has more than one auxiliary joining element, and all of the auxiliary joining elements are introduced by way of the method according to the invention. The auxiliary joining elements can have different dimensions or shapes, but are preferably all pressed together with the component in a common press stroke.

The component into which the auxiliary joining element(s) are introduced can be formed from a sheet-metal material, such as hot-formed steels, aluminum sheet or magnesium sheet, or a sheetlike fiber composite plastic, for example as a carbon-fiber reinforced (CFRP), glass-fiber reinforced (GFRP) or aramid-fiber reinforced component. The component can be in particular a formed sheet-metal part, wherein it is also possible to use cast components or profile parts, which are formed in a sheetlike manner at the joint(s). In particular, the component can be a vehicle body component or a vehicle body attachment part, preferably for a passenger vehicle body.

The component produced with the method according to the invention, also referred to as first component, can be further processed by way of known methods, for example to form a component assembly with at least one second component, wherein the auxiliary joining element(s) pressed together with the first component are welded, soldered and/or adhesively bonded to the second component.

Alternatively, by way of the method according to the invention, a component assembly can be produced in which the joined connection between the components is already established by the pressing in of the auxiliary joining elements. Such a component assembly has at least one first and second component, which are connected together by at least one auxiliary joining element. The at least one auxiliary joining element in this case projects through both components and connects them in the manner of a riveted connection.

The invention makes it advantageously possible for the undetachable introduction of the auxiliary joining elements into the component to be able to be integrated into an existing component production process, for example in a pressing plant, without the extra effort and expense of an additional installation or device, for example a riveting pliers solution. It is also contemplated to use the installation technology required for the method both for steel/steel and for mixed construction connections in the same line. It is precisely in combination with the above-described specific design of the pilot hole and the freedoms in the design of the auxiliary joining elements that unexpected possibilities arise of increasing the connection strength while at the same time reducing costs and cycle times.

The above-described properties, features and advantages of this invention and the manner in which these are achieved will become more clearly understandable in connection with the following description of the exemplary embodiments. Where the term "can" is used in this application, this relates both to the technical possibility and the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
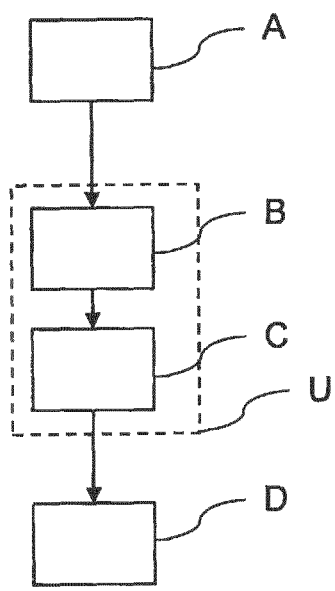
FIG. 1 is a flowchart for illustrating a method in accordance with an embodiment of the invention.

FIG. 1 shows a flowchart for illustrating a method according to an embodiment of the invention, with which one or more auxiliary joining elements are introduced undetachably into at least one component.

In a first method step A, the at least one component is provided with pilot holes by way of a press-bound tool. This step takes place in a first press stroke. In the following second press step B, an auxiliary joining element is inserted into each pilot hole. In a further method step C, the auxiliary joining elements are pressed together with the at least one component. The pressing of the auxiliary joining elements likewise takes place by way of a press-bound tool in a further work step or press stroke, which follows the first press stroke. The insertion of the auxiliary joining elements can take place in a separate work step or in the same press stroke in which the auxiliary joining elements are pressed, illustrated in FIG. 1 by the dashed boundary U. After step C, the auxiliary joining elements have been pressed undetachably to the at least one component and the at least one component can be fed in step D to further processing, which may be for example resistance spot welding, in order to cohesively connect the at least one component to a further component at the auxiliary joining elements.

Figure 2A:
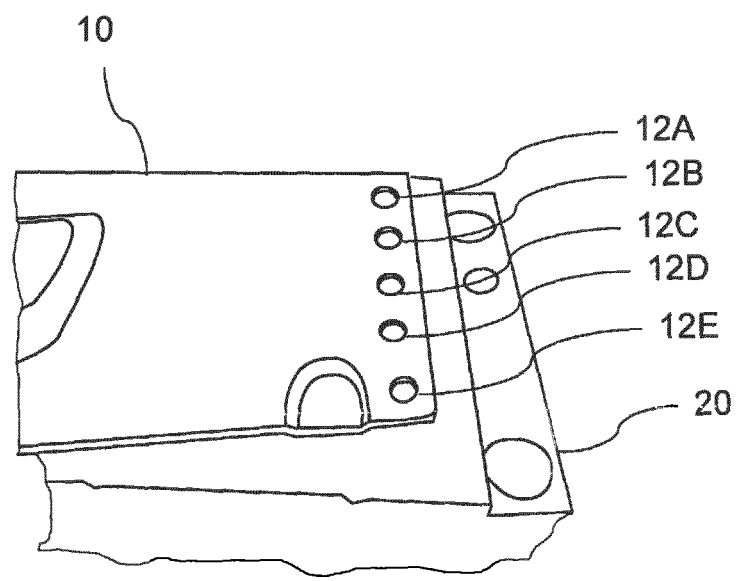
FIG. 2A is a plan view of a component provided with pilot holes on a press-bound tool lower part.
Figure 2B:
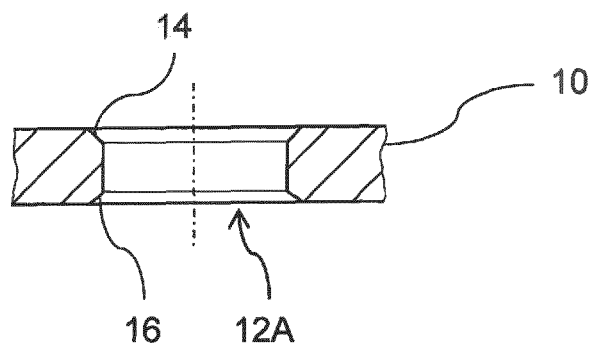
FIGS. 2B to 2D are sectional views of the component from FIG. 2A at different times in the method.
Figure 2C:
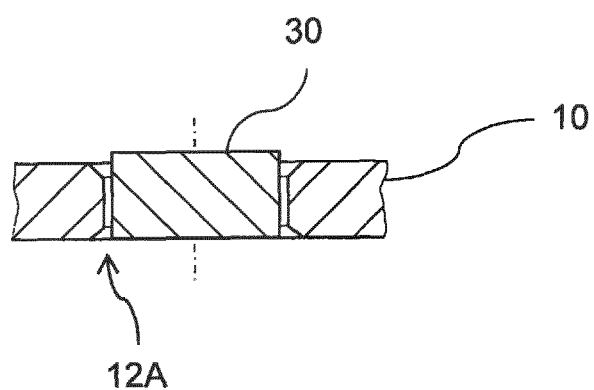

In step A, preferably pilot holes for all the auxiliary joining elements are formed, which are provided in the at least one component. The pilot holes are formed at points at which a joined connection is subsequently intended to be established with a further component. In order to provide pilot holes, the at least one component is introduced into a press-bound tool which includes corresponding stamping or cutting tools. The stamping or cutting tools are realized in a known manner and can be provided in the tool upper part and/or in the tool lower part. By way of the closing movement of the press, the tool upper part and tool lower part are guided toward one another and the holes are stamped or cut by way of the stamping or cutting tools. FIG. 2A shows, by way of example, a perspective illustration of a component 10 in the form of a closing plate extension on a tool lower part 20, with pilot holes 12A to 12E stamped out of the component 10. The pilot holes 12A to 12E have a substantially round cross section and extend through the component 10. At the two hole edges, respective chamfers 14 and 16 have been shaped into the component 10, see FIG. 2B, in which a sectional view of the component 10 through the pilot hole 12A is shown. The stamping or cutting tools can be provided to this end with portions that act as die stamps, or die stamps that are intended to be actuated separately can be provided in the press-bound tool. In the following, second method step B, auxiliary joining elements 30 are fed to the pilot holes. The auxiliary joining elements are preferably metal slugs with a cylindrical shape with a smaller diameter than the inside diameter of the pilot hole, as illustrated in FIG. 2C. A particular manner of fixing the metal slugs is not absolutely necessary, since these are positioned sufficiently by the pilot hole and rest for example on the lower tool.

Figure 2D:
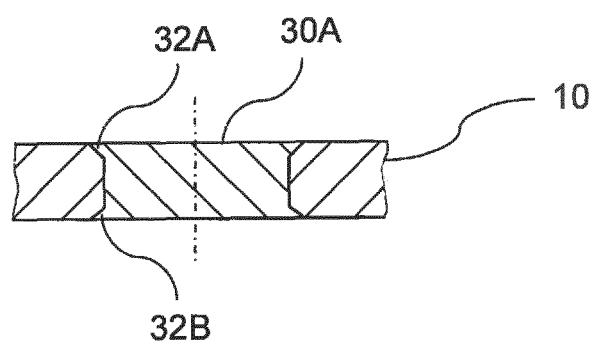

In the third method step C, the auxiliary joining elements 30 are then pressed together with the component 10 by way of a press-bound tool, to which end, the tool has for example appropriate riveting dies and dollies or dies. Preferably, the diameter and height of the auxiliary joining element 30 are dimensioned such that the latter completely fills the pilot hole after pressing and terminates flush at least with one component surface, as illustrated in the sectional view in FIG. 2D, which shows a sectional view of an auxiliary joining element 30A pressed together with the component 10. The exemplary auxiliary joining element 30 shown in FIG. 2C projects merely upwardly beyond the component 10. It goes without saying that the auxiliary joining element can likewise project only downwardly or both upwardly and downwardly beyond the component. Preferably, the auxiliary joining element 30A forms, during pressing, an undercut 32A and 32B on both sides, with the result that, in addition to a force-fitting connection, a form-fitting connection between the auxiliary joining element 30 and component 10 is also formed.

The feeding of the auxiliary joining elements 30 can take place in an automated manner. To this end, the riveting tool can have feeding devices and feeding lines which are formed in a known manner and with which the auxiliary joining elements can be brought to the pilot holes.

Figure 3:
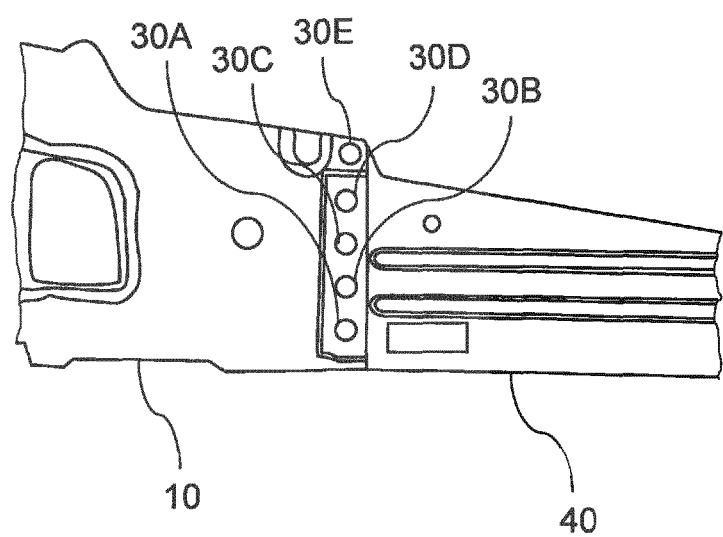
FIG. 3 is a side view of an exemplary component connection.

FIG. 3 shows a side view of an exemplary component assembly for covering a longitudinal member of a motor vehicle including the closing plate extension 10 from FIG. 2A and a closing plate 40. The closing plate 40 is a formed steel-sheet part, and the closing plate extension 10 is formed from an aluminum sheet. With the above-described method, five auxiliary joining elements 30A to 30E in the form of steel slugs have been pressed together with the closing plate extension 10. The auxiliary joining elements 30A to 30E have been welded to the closing plate 40 by conventional resistance spot welding.

According to the invention, a maximum of three press strokes are required with the method in order to press all the necessary auxiliary joining elements together with the at least one component. The figures show, by way of example, the introduction of five identical pilot holes and five identical auxiliary joining elements 30. This number can of course be varied from only one hole and one auxiliary joining element up to a large number, for example several 10s. Likewise, it is possible for individual or all pilot holes and auxiliary joining elements to differ in terms of their dimensions and/or shapes and the orientation of the hole axes from the other pilot holes and auxiliary joining elements.

In the figures, the introduction of auxiliary joining elements into only one component is illustrated. It goes without saying that the method can likewise be used in order to introduce auxiliary joining elements into two or more components that partially or completely overlap one another, wherein the components are fixed together by the pressed auxiliary joining element(s) in the manner of a riveted connection. In this case, the several components are arranged preferably one on top of another and are provided with one or more pilot holes in a common press stroke.

The press-bound tool can additionally also be in the form of a forming tool and/or cutting tool, such that it is possible for further features, for example beads or recesses in the component, to be formed for example simultaneously with the formation of the pilot holes.

The exemplary embodiments are not true to scale and not limiting. Modifications that fall within the routine activities of a person skilled in the art are possible.

| List of reference signs | |
|---|---|
| A, B, C, D | Method acts |
| U | Press stroke |
| 10 | Component |
| 12A to 12E | Pilot hole |
| 14, 16 | Chamfer |
| 20 | Tool lower part |
| 30, 30A to 30E | Auxiliary joining element |
| 32A, 32B | Undercut |
| 40 | Closing plate |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for undetachably introducing an auxiliary joining element into at least one joint of at least on component, the method comprising the acts of:
   a) punching the at least one component at the at least one joint in a first press stroke a tool press, wherein a pilot hole is formed at the at least one joint;
   b) inserting an auxiliary joining element into the pilot hole; and
   c) pressing the auxiliary joining element together with the at least one component in subsequent press stroke or work step in order to form a cohesive, form-fitting and/or force-fitting connection between the at least one component and the auxillary joining element, wherein a plurality of pilot holes are formed in the act a),
   an auxiliary joining element inserted into each of the plurality of pilot hole in the act b),
   all of the auxillary joining element inserted into the plurality of pilot holes are pressed together with the at least one component in the act c), wherein the auxiliary joining elements are thicker than the at least one component so that the auxiliary joining elements project beyond at leas one longitudinal surface of the at least one component,
   at least one of the plurality of pilot holes is provided at both hole edges with chamfer, and
   the auxiliary joining element is in the form of am metal slug.

2. The method according to claim 1, wherein the act b) is carried out in a second press stroke, which is carried out between the first press stroke of the act a) and the subsequent press stroke or work step of the act c).

3. The method according to claim 2, wherein further component processing takes place in the first press stroke, the second press stroke and/or the subsequent press stroke.

4. The method according to claim 1, wherein the act b) and the act c) are carried out in a common press stroke.

5. The method according to claim 1, wherein further component processing takes place in the first press stroke, the second press stroke and/or the subsequent press stroke.

6. The method according to claim 1, wherein
   the pilot hole is provided at both hole edges with a chamfer, and
   the auxiliary joining element is in the form of a metal slug.

7. The method according to claim 6, wherein the pressed auxiliary joining element is connected to the at least one component in a form-fitting manner by an undercut on both sides.

8. The method according to claim 1, wherein the pressed auxiliary joining element is connected to the at least one component in a form-fitting manner by an undercut on both sides.

9. The method according to claim 8, wherein
   the auxiliary joining element is a steel slug, and
   the at least one component is made of a lightweight material.

10. The method according to claim 1, wherein
    the auxiliary joining element is a steel slug, and
    the at least one component is made of a lightweight material.

11. The method according to claim 1, wherein the at least one component is a vehicle body component or a vehicle body attachment part.

* * * * *